US010651530B2

(12) United States Patent
Okumura et al.

(10) Patent No.: US 10,651,530 B2
(45) Date of Patent: May 12, 2020

(54) DECORATIVE COMPONENT FOR VEHICLE

(71) Applicant: TOYODA GOSEI CO., LTD., Kiyosu-shi, Aichi-ken (JP)

(72) Inventors: Koji Okumura, Kiyosu (JP); Hideto Maeda, Kiyosu (JP); Tetsuo Yasuda, Kiyosu (JP); Seiya Tokunaga, Kiyosu (JP); Tatsuya Oba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 122 days.

(21) Appl. No.: 15/596,027

(22) Filed: May 16, 2017

(65) Prior Publication Data

US 2017/0352938 A1 Dec. 7, 2017

(30) Foreign Application Priority Data

Jun. 1, 2016 (JP) ................................. 2016-110249
Jun. 1, 2016 (JP) ................................. 2016-110250

(51) Int. Cl.
*H01Q 1/02* (2006.01)
*H01Q 1/32* (2006.01)
(Continued)

(52) U.S. Cl.
CPC ............. *H01Q 1/02* (2013.01); *B60R 13/005* (2013.01); *B60R 13/04* (2013.01); *B60S 1/66* (2013.01);
(Continued)

(58) Field of Classification Search
CPC .......... H01Q 1/02; H01Q 1/32; H01Q 1/3233; H01Q 1/3283; H01Q 1/42; H01Q 1/422;
(Continued)

(56) References Cited

U.S. PATENT DOCUMENTS 6,184,842 B1 * 2/2001 Leinweber .............. B29C 45/16
156/60
6,674,392 B1 * 1/2004 Schmidt ................ G01S 13/931
342/70
(Continued)

FOREIGN PATENT DOCUMENTS

DE 10 2004 021 630 A1 12/2005
DE 10 2006 046 436 B3 4/2008
(Continued)

OTHER PUBLICATIONS

Extended European Search Report dated Oct. 17, 2017 issued in corresponding EP patent application No. 17171512.1.
(Continued)

*Primary Examiner* — Daniel Munoz
*Assistant Examiner* — Patrick R Holecek
(74) *Attorney, Agent, or Firm* — Posz Law Group, PLC

(57) ABSTRACT

A decorative component for a vehicle includes a decorative body portion having millimeter wave transmittance and a heating sheet. The decorative body portion is configured to decorate the vehicle by being attached to part of a vehicle on a leading side in a transmitting direction of millimeter waves from a millimeter wave radar device. The heating sheet includes a plastic sheet and a wire-shaped heater provided on the plastic sheet. At least a main portion of the heating sheet is provided integrally with the decorative body portion. The thickness in the front-rear direction is set uniform in at least a transmittance area of millimeter waves in the decorative body portion and the heating sheet.

15 Claims, 11 Drawing Sheets

(51) Int. Cl.
*B60R 13/00* (2006.01)
*G01S 7/02* (2006.01)
*B60R 13/04* (2006.01)
*G01S 13/931* (2020.01)
*H01Q 1/42* (2006.01)
*B60S 1/66* (2006.01)
*H01Q 1/44* (2006.01)
*H05B 3/26* (2006.01)
*G01S 7/40* (2006.01)

(52) U.S. Cl.
CPC .............. *G01S 7/02* (2013.01); *G01S 13/931* (2013.01); *H01Q 1/3233* (2013.01); *H01Q 1/3283* (2013.01); *H01Q 1/422* (2013.01); *H01Q 1/425* (2013.01); *H01Q 1/44* (2013.01); *H05B 3/267* (2013.01); *G01S 2007/027* (2013.01); *G01S 2007/4047* (2013.01); *G01S 2013/93271* (2020.01)

(58) Field of Classification Search
CPC .. H01Q 1/425; H01Q 1/44; G01S 7/02; G01S 13/931; G01S 2007/027; G01S 2007/4047; G01S 2013/9375; B60R 13/005; B60R 13/04; B60S 1/66; H05B 3/267
See application file for complete search history.

(56) References Cited

U.S. PATENT DOCUMENTS

| | | | | | |
|---|---|---|---|---|---|
| 6,961,023 | B2* | 11/2005 | Fujii | ................. | B29C 45/1671 343/700 MS |
| 7,326,894 | B2* | 2/2008 | Meiler | .................... | H01Q 1/02 219/663 |
| 2002/0044101 | A1 | 4/2002 | Zimmermann | | |
| 2003/0052810 | A1* | 3/2003 | Artis | .................... | H01Q 1/3233 342/1 |
| 2004/0125023 | A1 | 7/2004 | Fujii et al. | | |
| 2014/0354465 | A1 | 12/2014 | Lee et al. | | |
| 2015/0140259 | A1 | 5/2015 | Sugiura et al. | | |
| 2016/0111776 | A1 | 4/2016 | Okumura et al. | | |
| 2016/0261034 | A1 | 9/2016 | Geise | | |

FOREIGN PATENT DOCUMENTS

| | | | | |
|---|---|---|---|---|
| DE | 10 2011 107 216 A1 | | 3/2012 | |
| DE | 10 2013 221 064 A1 | | 4/2015 | |
| DE | 10 2014 002 438 A1 | | 8/2015 | |
| DE | 10 2015 004 204 A1 | | 8/2015 | |
| DE | 10 2014 214 329 A1 | | 1/2016 | |
| DE | 102014214329 A1 * | | 1/2016 | ............... H01Q 1/02 |
| EP | 1 160 914 A2 | | 12/2001 | |
| JP | 2002-022821 A | | 1/2002 | |
| JP | 2002-131413 A | | 5/2002 | |
| JP | 2004-020514 A | | 1/2004 | |
| JP | 2004-138572 A | | 5/2004 | |
| JP | 2004-251868 A | | 9/2004 | |
| JP | 3117480 U | | 1/2006 | |
| JP | 2015-099081 A | | 5/2015 | |
| JP | 2016-080479 A | | 5/2016 | |

OTHER PUBLICATIONS

Office Action dated Jun. 25, 2019 issued in corresponding JP patent application No. 2016-110250 (with English translation).
Office Action dated Jul. 2, 2019 issued in corresponding JP patent application No. 2016-110249 (with English translation).

* cited by examiner

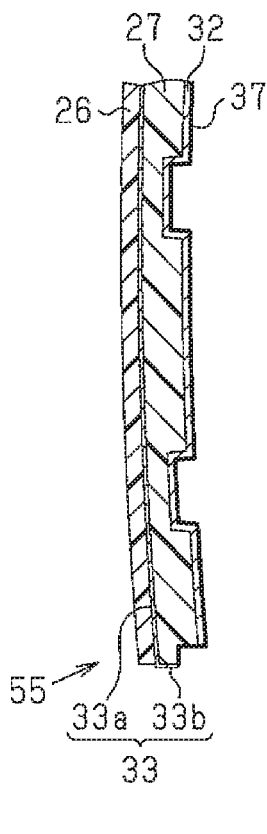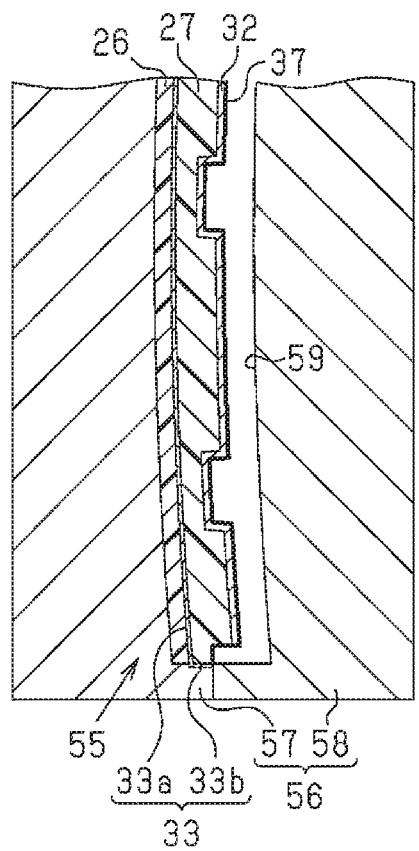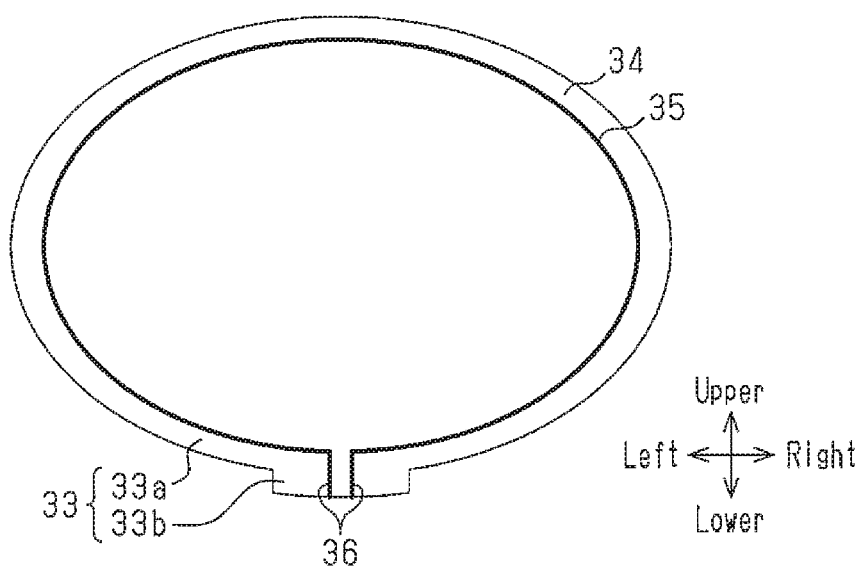

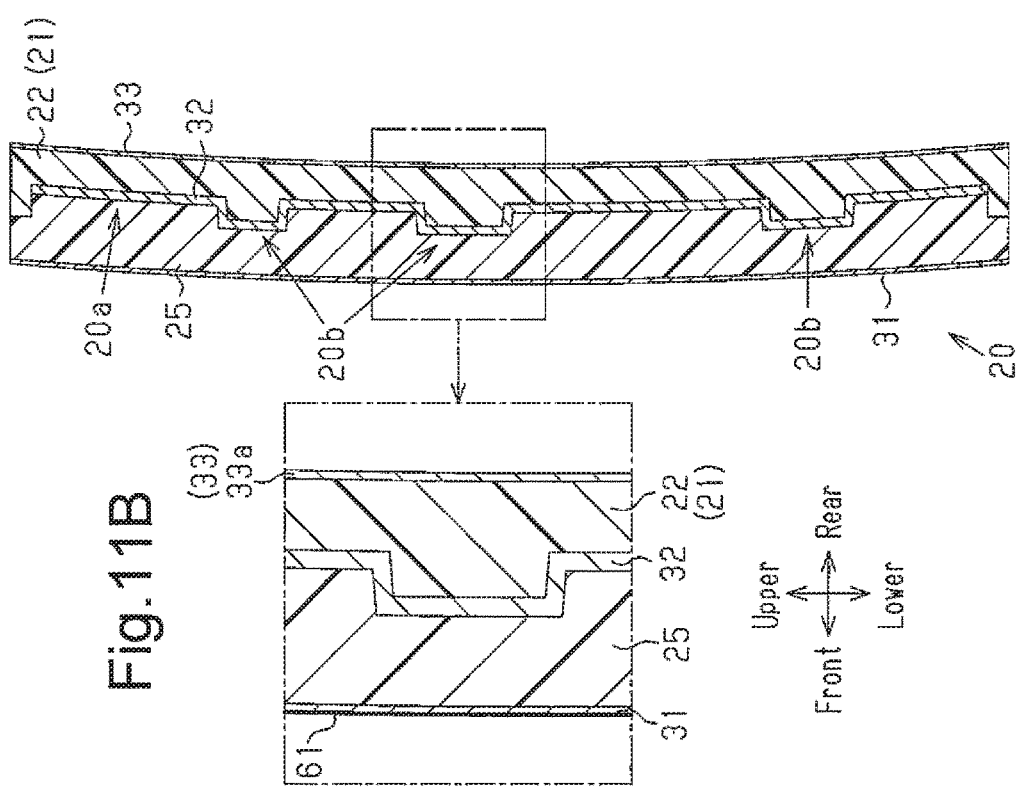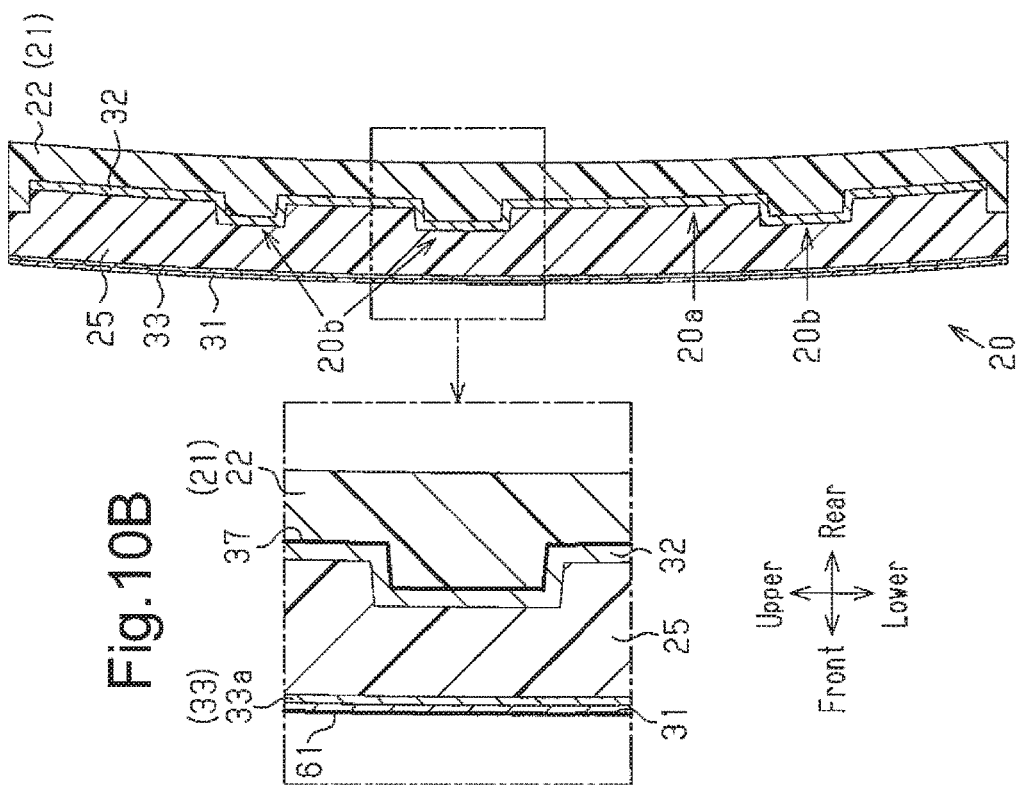

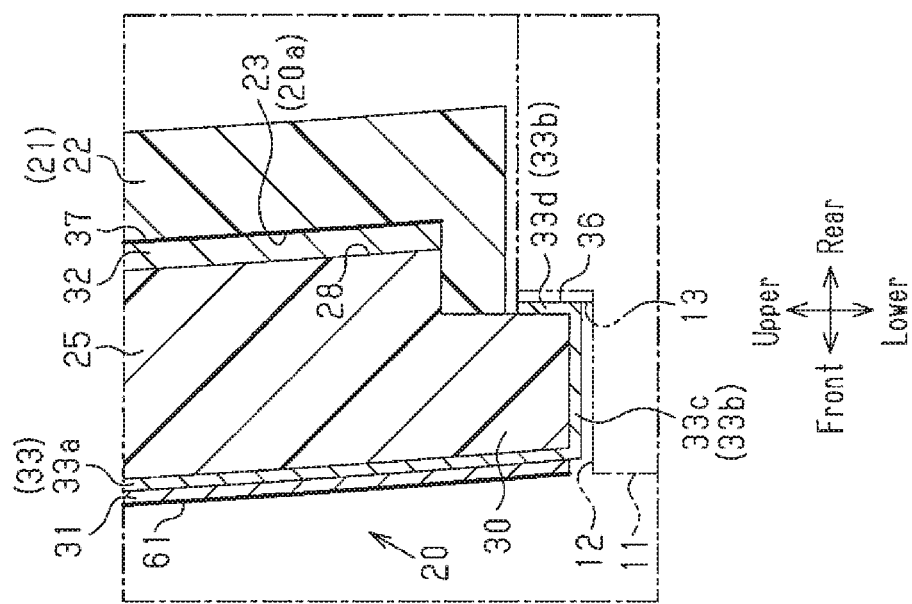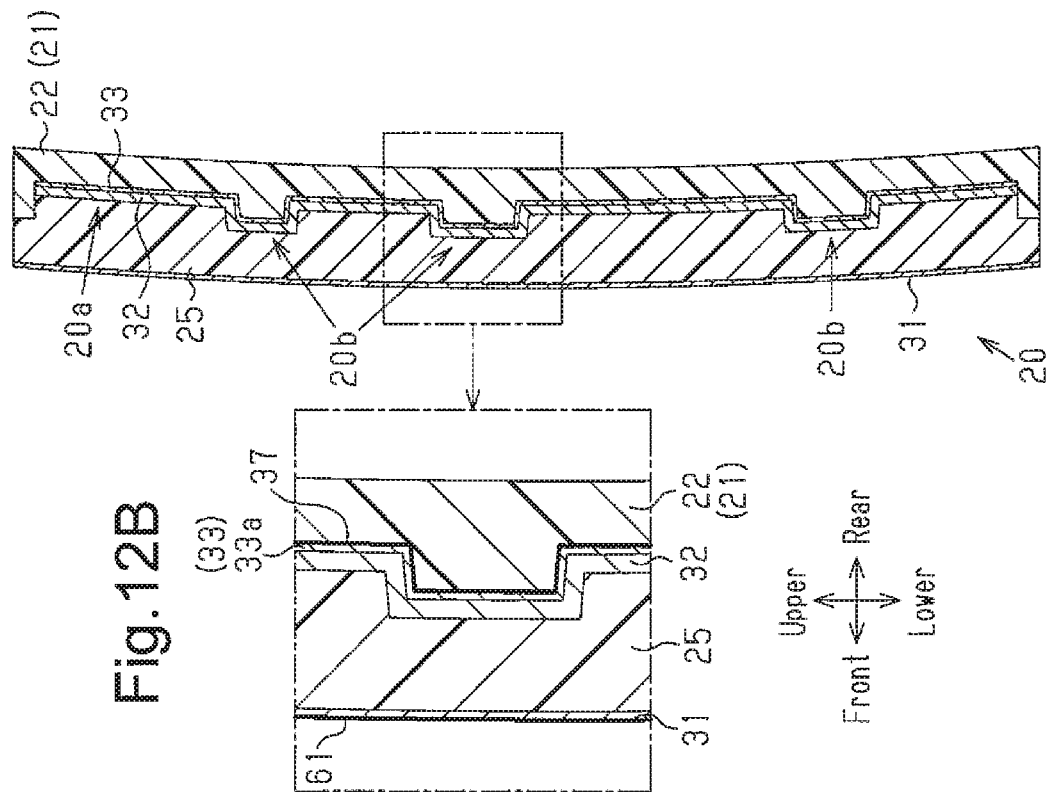

DECORATIVE COMPONENT FOR VEHICLE

BACKGROUND OF THE INVENTION

The present invention relates to a decorative component for a vehicle that decorates the vehicle and has transmittance of millimeter waves from a millimeter wave radar device.

A vehicle may have a millimeter wave radar device on the rear side of a decorative component for a vehicle, such as a front grille or an emblem, to measure the inter-vehicle distance or the distance from an obstacle using millimeter waves. Conventionally, the millimeter wave radar device temporarily stops measurement when snow adheres to the decorative component. However, as use of a millimeter wave radar device becomes common, it is demanded that measurement be continued regardless of snow.

To meet the demand, a snow melting function may be added to the decorative component. For example, a decorative component for a vehicle disclosed in Japanese Laid-Open Patent Publication No. 2004-138572 includes a decorative body portion configuring a main portion of the decorative component and a heater wire arranged on the front surface of the decorative body portion. The heater wire has a plurality of parallel linear sections spaced apart at regular intervals. Also, a groove portion is arranged between each adjacent pair of the linear sections of the heater wire on the front surface of the decorative body portion. The groove portions extend parallel to the linear sections. In this decorative component for a vehicle, the snow adhering to the front surface is melted and converted into water by the heat generated by the heater wire. The water then flows down in the groove portions and is drained from the decorative component.

A decorative component for a vehicle disclosed in Japanese Laid-Open Patent Publication No. 2002-22821 includes a decorative body portion configuring a main portion of the decorative component and a metal layer arranged on the decorative body portion. The decorative component electrifies and heats the metal layer, thus melting the snow adhering to the decorative component.

There is a demand that a decorative component for a vehicle should decrease attenuation of millimeter waves when the millimeter waves are transmitted through the decorative component. On the other hand, it has been discovered that there is a constant relationship between the attenuation amount of millimeter waves and the thickness of a decorative component for a vehicle. More specifically, it has been discovered that the attenuation amount of millimeter waves is small if a decorative component for a vehicle has multiple thicknesses that satisfy a certain condition. However, in the decorative component for a vehicle disclosed in Japanese Laid-Open Patent Publication No. 2004-138572, the groove portions in the front surface of the decorative body portion form an uneven surface of the decorative body portion. This makes it difficult to decrease the attenuation amount of millimeter waves.

In the decorative component for a vehicle disclosed in Japanese Laid-Open Patent Publication No. 2002-22821, the millimeter waves transmitted from a millimeter wave radar device may be reflected by the metal layer.

Although the heater wire described in Japanese Laid-Open Patent Publication No. 2004-138572 and the metal layer described in Japanese Laid-Open Patent Publication No. 2002-22821 each exert a function of melting adhering snow, the heater wire and the metal layer interfere with millimeter waves when the millimeter waves are transmitted through the respective decorative components and thus may decrease the transmittance performance.

Therefore, even though Japanese Laid-Open Patent Publications No. 2004-138572 and No. 2002-22821 are capable of melting adhering snow, both can be further improved to ensure proper transmittance of millimeter waves.

SUMMARY OF THE INVENTION

Accordingly, it is an objective of the present invention to provide a decorative component for a vehicle capable of exerting a snow melting function and improving millimeter wave transmittance performance.

To achieve the foregoing objective and in accordance with one aspect of the present invention, a decorative component for a vehicle is provided. The decorative component includes a decorative body portion having a millimeter wave transmittance. The decorative body portion is configured to be attached to part of a vehicle on a leading side in a transmitting direction of a millimeter wave from a millimeter wave radar device to decorate the vehicle. The decorative component includes a heating sheet including a plastic sheet and a wire-shaped heater provided on the plastic sheet. At least a main portion of the heating sheet is provided integrally with the decorative body portion. In the decorative body portion and the heating sheet, a thickness in a front-rear direction is set uniform in at least a transmittance area of the millimeter wave.

BRIEF DESCRIPTION OF THE DRAWINGS

FIGS. 8A and 8B are partial cross-sectional views each illustrating a part of the manufacturing process of the emblem of the first embodiment.

FIG. 9 is a front view showing a heating sheet when removed from an emblem according to a second embodiment.

FIG. 10A is a cross-sectional side view showing an emblem according to a third embodiment.

FIG. 10B is an enlarged cross-sectional side view showing a section of FIG. 10A.

FIG. 11A is a cross-sectional side view showing an emblem according to a fourth embodiment.

FIG. 11B is an enlarged cross-sectional side view showing a section of FIG. 11A.

FIG. 12A is a cross-sectional side view showing an emblem according to a fifth embodiment.

FIG. 12B is an enlarged cross-sectional side view showing a section of FIG. 12A.

FIG. 13 corresponds to FIG. 5 and is a cross-sectional partial side view illustrating a modification of a connecting portion of a heating sheet according to the third embodiment.

DETAILED DESCRIPTION OF THE PREFERRED EMBODIMENTS

First Embodiment

Figure 1:
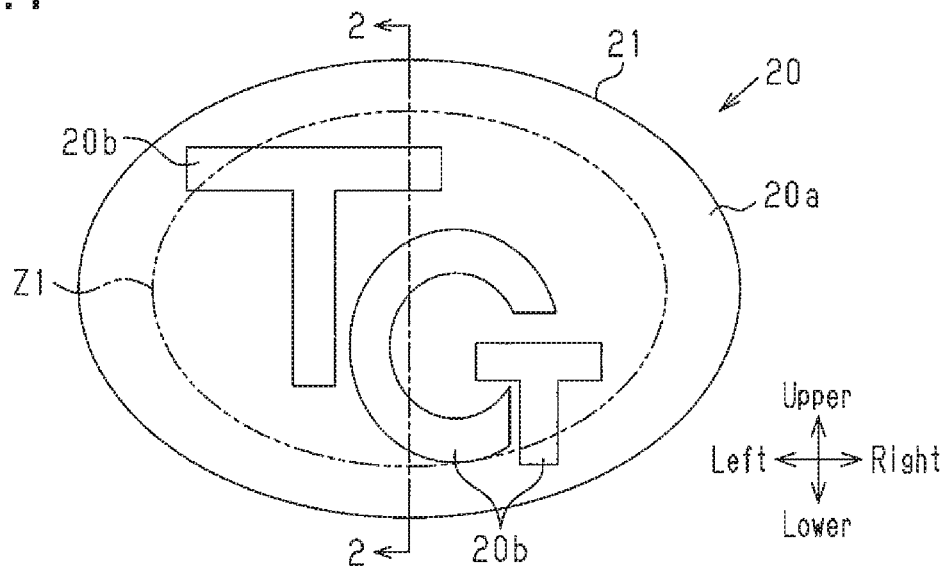
FIG. 1 is a front view showing an emblem according to a first embodiment.

A decorative component for a vehicle according to a first embodiment, which is an emblem, will now be described with reference to FIGS. 1 to 8B. In the drawings, the components are shown in varied scales, as needed, to facilitate recognition of the components.

Figure 2:
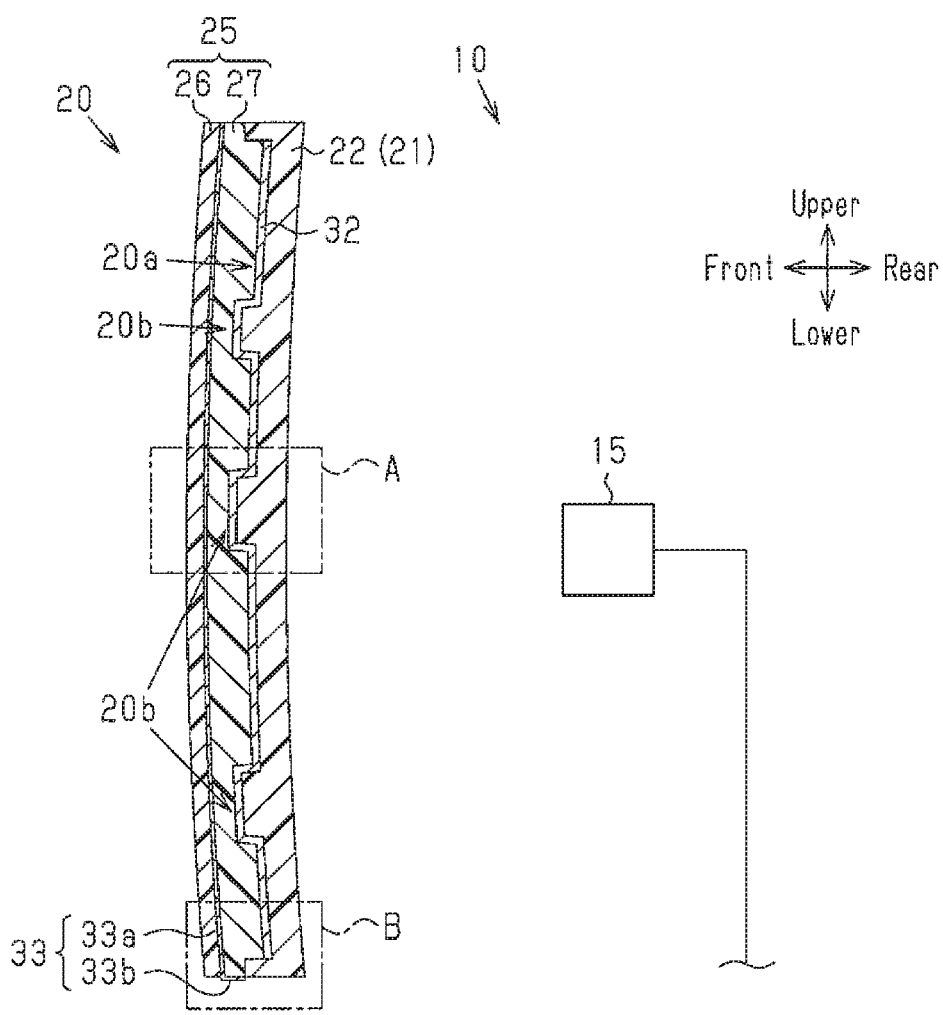
FIG. 2 is a diagram illustrating a cross-sectional structure of the emblem taken along line 2-2 of FIG. 1, together with a millimeter wave radar device.
Figure 5:
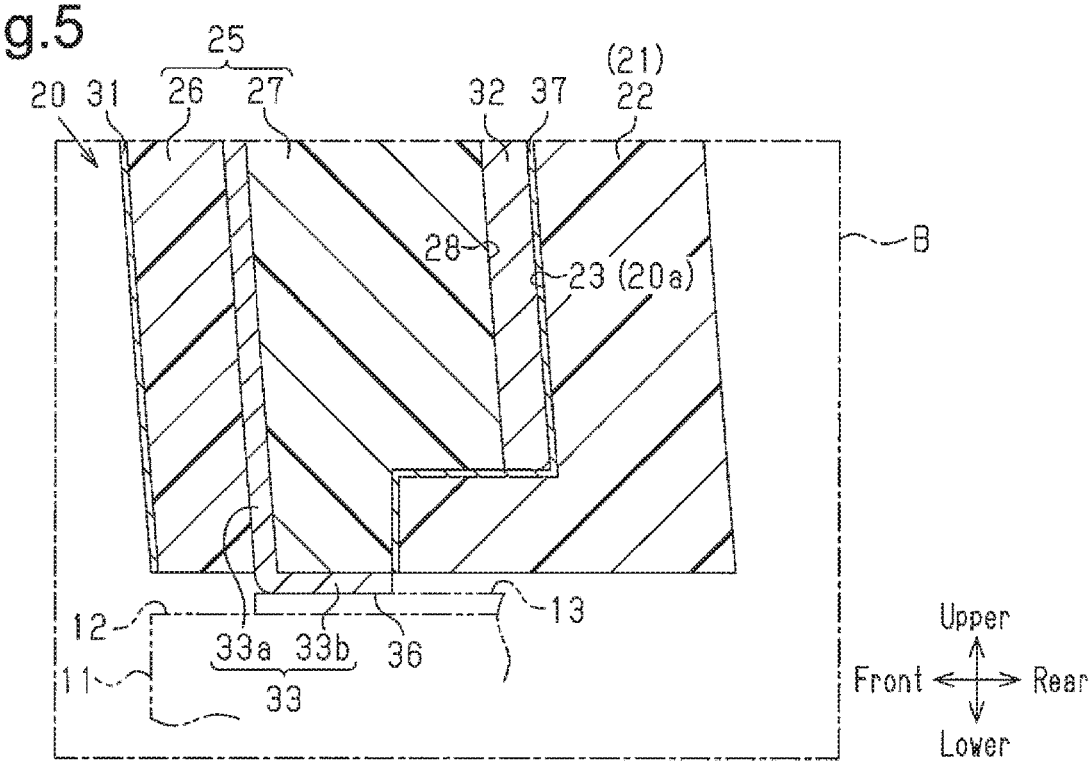
FIG. 5 is an enlarged cross-sectional side view showing Section B of FIG. 2.

As shown in FIGS. 2 and 5, a front grille 11 is attached to the front section of the engine compartment of a vehicle 10 to introduce external air, such as relative wind, into the engine compartment to cool a radiator. FIG. 5 illustrates a section of the front grille 11 with the long dashed double-short dashed lines.

As shown in FIG. 2, a millimeter wave radar device 15, which functions as a sensor for the adaptive cruise control (ACC), is attached to part that is rearward of the front grille 11 and on the front side of the radiator. The millimeter wave radar device 15 transmits millimeter waves and receives the millimeter waves that have hit and been reflected by a target. Using the difference between the transmitted waves and the received waves, the millimeter wave radar device 15 measures the inter-vehicle distance and the relative speed between the vehicle 10 and the vehicle located forward of the vehicle 10. The millimeter wave refers to a radio wave having a wavelength of 1 to 10 mm and a frequency of 30 to 300 GHz. In accordance with the ACC, the inter-vehicle distance is controlled by controlling the engine throttle or braking based on the measurement of the millimeter wave radar device 15 to accelerate or decelerate the vehicle 10.

Like typical front grilles, the front grille 11 has uneven thickness. A metal plating layer is arranged on the surface of a plastic base member of the front grille 11 as in the typical front grilles. This causes interference between the front grille 11 and transmitted or reflected millimeter waves. Therefore, as represented by the long dashed double-short dashed lines in FIG. 5, a window portion 12 is arranged in the front grille 11 at a position corresponding to the path of the millimeter waves from the millimeter wave radar device 15. Specifically, the window portion 12 is arranged at a position located on the leading side in the transmitting direction of the millimeter waves from the millimeter wave radar device. The window portion 12 is a section of the front grille 11 for receiving an emblem 20, which will be discussed below. Two power-feeding connection terminals 13 are arranged in a bottom section of an inner wall surface of the window portion 12. The connection terminals 13 each have a flat shape extending in the front-rear direction.

As shown in FIGS. 1 and 2, the emblem 20 includes a decorative body portion 21 configuring a main portion of the emblem 20 and a heating sheet 33. The decorative body portion 21 includes a base member 22, a transparent member 25, and a decoration layer 32 and is shaped as an oval plate as a whole. The decorative body portion 21 is gently curved to bulge forward.

The base member 22 is colored using plastic material such as acrylonitrile-ethylene-styrene (AES) copolymer plastic, which has a small dielectric loss tangent. The dielectric loss tangent is an indicator of the extent of electric energy loss in a dielectric body. The dielectric loss tangent of AES plastic is 0.007. A small dielectric loss tangent hampers conversion of millimeter waves into thermal energy. Attenuation of the millimeter waves is thus restrained.

Figure 4:
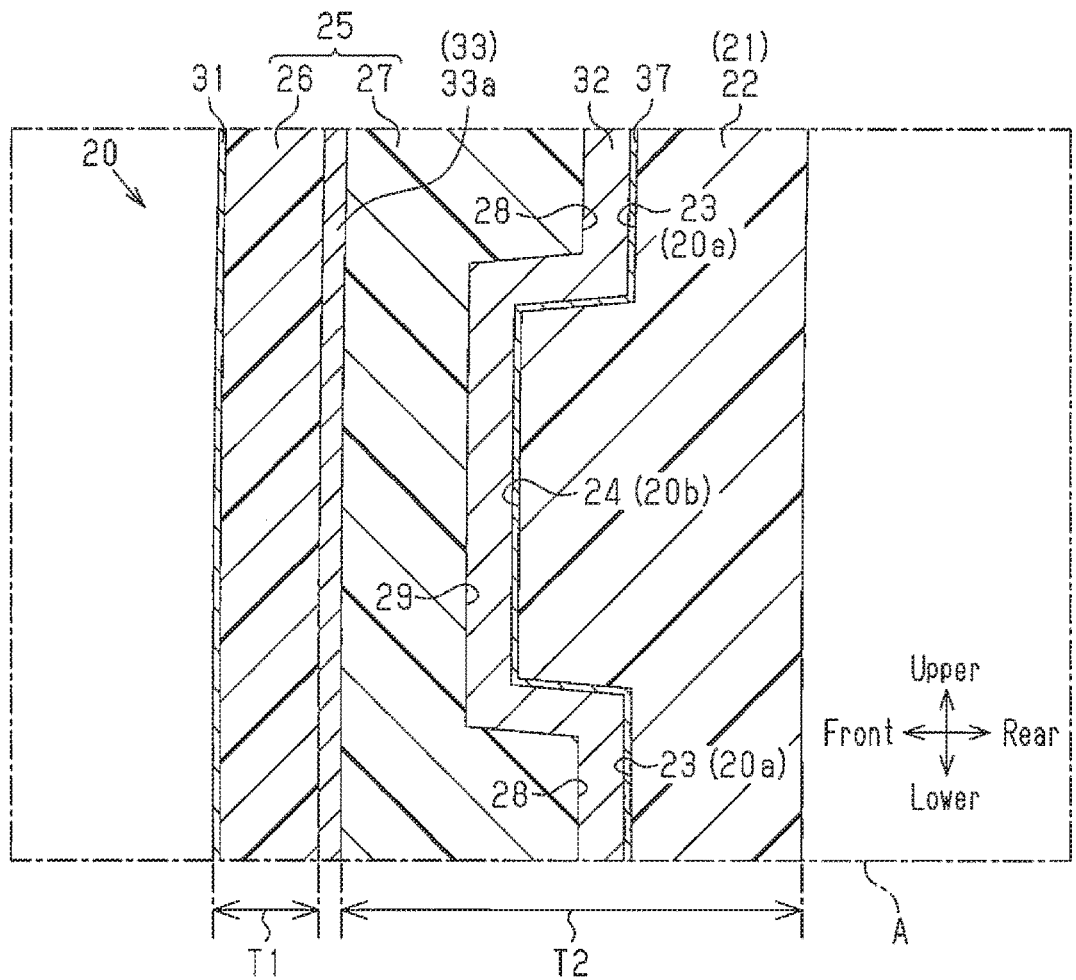
FIG. 4 is an enlarged cross-sectional side view showing Section A of FIG. 2.

FIG. 4 shows Section A of FIG. 2 in an enlarged state. As shown in FIG. 4, general portions 23, each of which extends substantially perpendicular to the front-rear direction, and protrusions 24, which protrude forward with respect to the general portions 23, are arranged in the front section of the base member 22. The general portions 23 correspond to a background area 20a of the emblem 20 of FIG. 1 and the protrusions 24 correspond to a character area 20b of the emblem 20. The base member 22 may be made of, instead of AES plastic, a plastic having a relative permittivity close to that of the transparent member 25, such as acrylonitrile-styrene-acrylate copolymer (ASA) plastic, polycarbonate (PC) plastic, or acrylonitrile-butadiene-styrene copolymer (PC/ABS) plastic.

As illustrated in FIGS. 2 and 4, the transparent member 25 is formed to be transparent using plastic material such as PC plastic, which is a plastic material having a small dielectric loss tangent. The dielectric loss tangent of PC plastic is 0.006. The relative permittivity of PC plastic is substantially equal to that of AES plastic. The transparent member 25 is arranged on the front side of the base member 22. The transparent member 25 is divided into a front transparent portion 26, which configures a front section of the transparent member 25, and a rear transparent portion 27, which configures a rear section of the transparent member 25. A rear section of the rear transparent portion 27 is formed in a shape corresponding to the shape of a front section of the base member 22. That is, general portions 28, each of which extends substantially perpendicular to the front-rear direction, are arranged at positions in the rear section of the rear transparent portion 27 that are located forward of the corresponding general portions 23 of the base member 22. Recesses 29, each of which is recessed forward with respect to the general portions 28, are arranged at positions in the rear section of the rear transparent portion 27 that are located forward of the protrusions 24 of the base member 22.

The transparent member 25 may be made of polymethyl methacrylate (PMMA) plastic, which is plastic material having a small dielectric loss tangent, like the aforementioned PC plastic.

A hard coating layer 31 is arranged on a front surface of the front transparent portion 26 by applying a publicly known surface treatment agent for plastic. The surface treatment agent may be, for example, an organic hard coating agent such as an acrylate-based, oxetane-based, or silicone-based hard coating agent or an inorganic hard coating agent or an organic-inorganic hybrid hard coating agent. The hard coating layer 31, which is made of the hard coating agent, exerts useful effects including a scratch preventing effect, a contamination preventing effect, an effect of improving light resistance and weather resistance by ultraviolet protection, and an improved water repellent effect. The hard coating layer 31 may be colored, as needed, in such a range that millimeter waves are allowed to be transmitted through the hard coating layer 31.

The decoration layer 32 decorates the front section of the vehicle 10 including the front grille 11. The decoration layer 32 is arranged between the base member 22 and the rear transparent portion 27 and has millimeter wave transmittance. The decoration layer 32 is configured by a combination of a metal layer and a colored layer such as a black layer. The colored layer is arranged on the general portions 28 of the rear transparent portion 27 by a method such as printing. The metal layer is arranged on the rear surface of each of the recesses 29 of the rear transparent portion 27 and the entire rear surface of the colored layer by vapor deposition of metal material such as indium. In the decoration layer 32, the metal layer may be coated by a corrosion preventing layer made of plastic material such as acrylic-based or urethane-based plastic material in order to limit corrosion of the metal layer.

Figure 3:
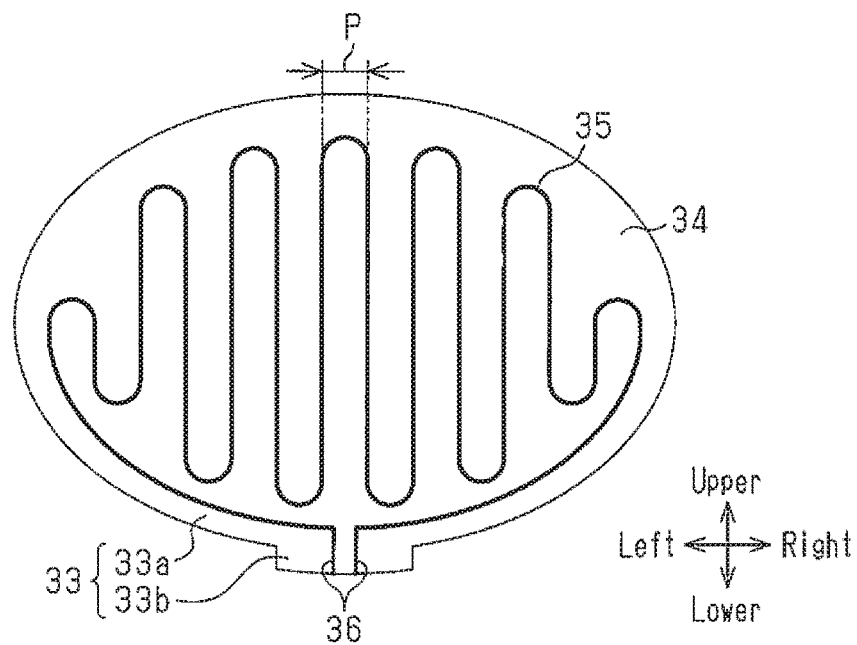
FIG. 3 is a front view showing a heating sheet when removed from the emblem of the first embodiment.

As shown in FIGS. 2 and 3, the heating sheet 33 includes a plastic sheet 34 and a wire-shaped heater 35, which is arranged on the plastic sheet 34. The heating sheet 33 is referred to also as a sheet heating body or a film heater. The plastic sheet 34 is made of PC plastic, for example. The wire-shaped heater 35 is formed by, for example, printing a Nichrome wire, a transparent conductive film, a carbon heating body, or silver paste on the plastic sheet 34. The heater 35 may also be coated on the front side using plastic material.

A main portion 33a of the heating sheet 33 is arranged between the front transparent portion 26 and the rear transparent portion 27 to be laminated with the front transparent portion 26 and the rear transparent portion 27. The main portion 33a is held in tight contact with the front transparent portion 26 and the rear transparent portion 27 and is integrated with the front transparent portion 26 and the rear transparent portion 27. Like the above-described decorative body portion 21, the main portion 33a is gently curved to bulge forward. The heater 35 is arranged substantially on the entire area of the main portion 33a in a state repeatedly bent in a waveform manner. More specifically, the heater 35 has multiple linear sections spaced apart in the lateral direction. The linear sections each extend in the vertical direction. When the distance between each adjacent pair of the linear sections is defined as a pitch P, it is preferable that the pitch P be 3 mm to 20 mm to ensure a heating amount necessary for melting snow and restrain the attenuation amount of millimeter waves to 2 dB or smaller. It is further preferable that pitch P be 5 mm to 15 mm.

FIG. 5 shows Section B of FIG. 2 in an enlarged state. As shown in FIGS. 3 and 5, the heating sheet 33 includes, in addition to the above-described main portion 33a, a connecting portion 33b, which extends from a lower end of the main portion 33a to the exterior of the decorative body portion 21. The connecting portion 33b is bent rearward at the boundary with the main portion 33a and extends rearward from the lower end of the main portion 33a. FIG. 3 illustrates the connecting portion 33b in a non-angled state. Power-receiving connection terminals 36, which are arranged in the opposite ends of the heater 35, are arranged in the connecting portion 33b. The connection terminals 36 each have a flat shape extending in the front-rear direction.

As shown in FIG. 4, a heat transfer restraining layer 37, which is made of a material having a temperature of deflection under load (a heat deformation temperature) higher than the base member 22, is arranged between the decoration layer 32 and the base member 22. In the first embodiment, the heat transfer restraining layer 37 is made of an ultraviolet (UV) curing coating.

In at least a transmittance area Z1 (see FIG. 1), which transmits millimeter waves, of the decorative body portion 21 and the heating sheet 33, the thickness T of the emblem 20 in the front-rear direction is set uniform to a value substantially equal to a value satisfying the following expression 1. The "value substantially equal" herein refers to a thickness included in an error range of ±0.2 mm.

$$T=[(\lambda e/2)/\sqrt{(\varepsilon p)}]n \qquad \text{(Expression 1)}$$

The symbols in the expression above refer to the items below.

λe: Wavelength of Millimeter Wave
εp: Relative Permittivity of Transparent Member 25 (Or Base member 22)
n: Integer As has been described, the thickness T of the emblem 20 is set to a multiple by an integer of a value obtained by dividing the half wavelength by a square root of the relative permittivity. In the first embodiment, the total thickness T1 of the front transparent portion 26 and the hard coating layer 31 in the front-rear direction is set to 1.2 mm. The total thickness T2 of the rear transparent portion 27, the decoration layer 32, the heat transfer restraining layer 37, and the base member 22 in the front-rear direction is set to 6.0 mm. That is, the thickness T2 corresponds to the distance between the front surface of the rear transparent portion 27 and the rear surface of the base member 22. As a result, the thickness T of the emblem 20 in the front-rear direction is set to approximately 7.2 mm.

Operation and advantages of the emblem 20 of the first embodiment, which has the above-described configuration, will hereafter be described, together with a manufacturing method of the emblem 20.

First, the manufacturing method of the emblem 20 will be described in brief with reference to FIGS. 6A to 8B. In the drawings, the left side corresponds to the front side of the emblem 20 and the right side corresponds to the rear side of the emblem 20.

Figure 6A:
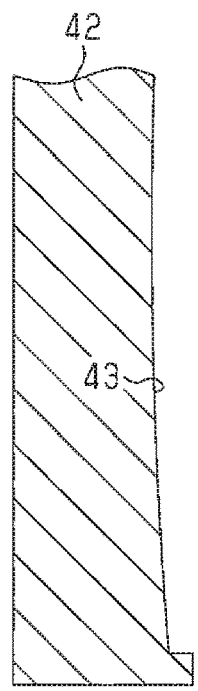
FIGS. 6A and 6B are partial cross-sectional views each illustrating a part of a manufacturing process of the emblem of the first embodiment.
Figure 6B:
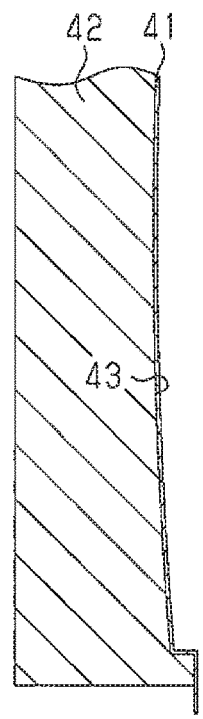

As shown in FIGS. 6A and 6B, a sheet member 41 having a plastic sheet and a heater arranged on the plastic sheet is pre-shaped. In pre-shaping, as shown in FIG. 6A, the sheet member 41 is arranged between a die 42 for shaping a heating sheet and a heater 44. The heater 44 is heated to soften the sheet member 41. The softened sheet member 41 is then pressed against the die 42, as illustrated in FIG. 6B, to suction air from between the sheet member 41 and the die 42. The space between the sheet member 41 and the die 42 thus becomes substantially vacuum. This causes tight contact between the sheet member 41 and the wall surface of a shaping recess 43 of the die 42, thus shaping the sheet member 41 in a shape corresponding to heating sheet 33. Then, by trimming unnecessary sections from the sheet member 41, which has been pre-shaped in the above-described manner, the heating sheet 33 configured by the main portion 33a, which is gently curved to bulge forward, and the connecting portion 33b, which is bent rearward at the boundary with the main portion 33a, is obtained (see FIG. 7B).

Figure 7A:
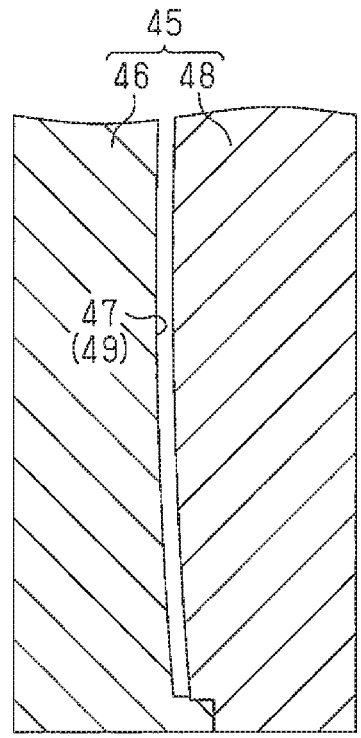
FIGS. 7A to 7E are partial cross-sectional views each illustrating a part of the manufacturing process of the emblem of the first embodiment.

Independently from the heating sheet 33, the front transparent portion 26 is formed by injection molding. Specifically, as shown in FIG. 7A, a fixed mold 46 and a movable mold 48, which constitute a mold set 45 for injection molding, are clamped. Molten plastic is injected into and fills a cavity 49 (a molding space), which is formed between the fixed mold 46 and the movable mold 48. As the molten plastic cures, the front transparent portion 26 is formed. The mold set 45 is then opened with the front transparent portion 26 remaining in the fixed mold 46.

Figure 7B:
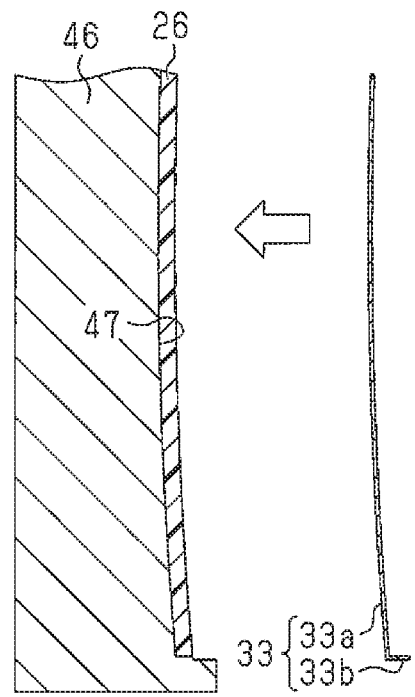

As illustrated in FIG. 7B, the heating sheet 33 is inserted and arranged in the fixed mold 46. Through this arrangement, the main portion 33a of the heating sheet 33 is laminated with the front transparent portion 26 and the connecting portion 33b is laminated with a bottom wall portion of a molding recess 47 in the fixed mold 46.

Figure 7C:
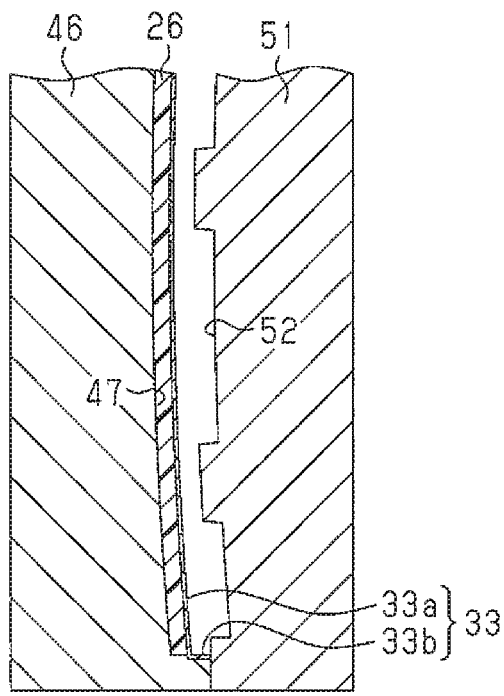

As shown in FIG. 7C, a movable mold 51 for molding a rear transparent portion, which is different from the movable mold 48, is used and the molds are clamped. At this time, not only the main portion 33a of the heating sheet 33 but also the connecting portion 33b is arranged in the molding recess 47 of the fixed mold 46. This restrains damage to a portion of the heating sheet 33, which is, particularly, the connecting portion 33b, due to catching by the fixed mold 46 and the movable mold 51 and receiving excessive force at the time of mold clamping.

Figures 7D, 7E:
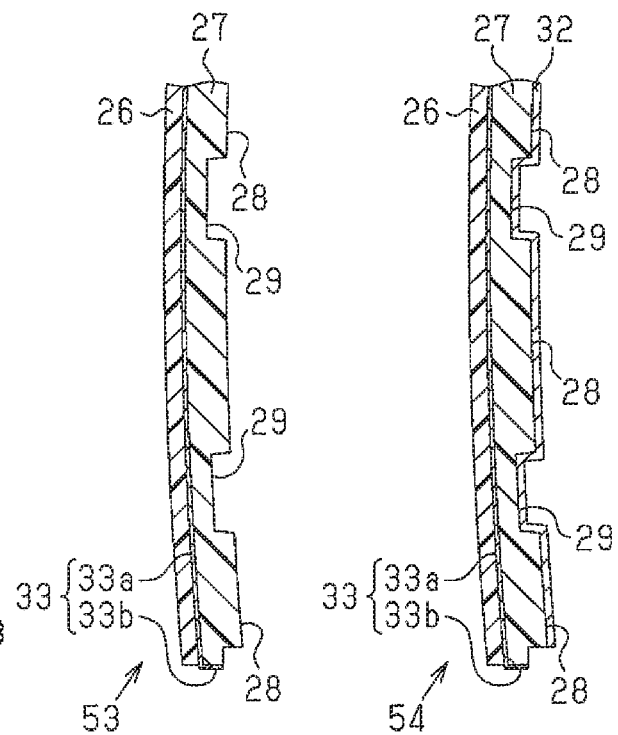

Molten plastic is injected into and fills a cavity 52, which is formed between the fixed mold 46 and the movable mold 51. As shown in FIG. 7D, as the molten metal cures, the rear transparent portion 27 having the general portions 28 and the recesses 29 is formed on the rear side of the heating sheet 33. In an intermediate molded body 53, which is obtained in the above-described manner, the main portion 33a of the heating sheet 33 is caught by the front transparent portion 26 and the rear transparent portion 27 and the connecting portion 33b contacts a lower surface of the rear transparent portion 27. The heating sheet 33 is thus integrated with the front transparent portion 26 and the rear transparent portion 27 only at the main portion 33a. The connecting portion 33b is located outside the front transparent portion 26 and the rear transparent portion 27.

After removing the intermediate molded body 53 from the molds, printing, vapor deposition, and the like are performed on the general portions 28 and the recesses 29 of the rear transparent portion 27 to obtain an intermediate molded body 54, as illustrated in FIG. 7E. In the intermediate molded body 54, the decoration layer 32, which has uniform thickness, is superposed on the general portions 28 and the recesses 29.

Then, ultraviolet curable ink is applied to the decoration layer 32 and irradiated with ultraviolet rays from a known ultraviolet curing device, which includes a light source lamp and an irradiator (a lamp house). A high-pressure mercury lamp or a metal halide lamp may be used as the light source lamp. As the ink cures, an intermediate molded body 55 having the heat transfer restraining layer 37 formed on the decoration layer 32 is obtained, as illustrated in FIG. 8A.

As shown in FIG. 8B, the intermediate molded body 55 is set in a cavity 59 between a fixed mold 57 and a movable mold 58, which constitute an injection-molding mold set 56. Molten plastic is injected into and fills the space in the cavity 59 located on the rear side of the heat transfer restraining layer 37. As the molten plastic cures, the base member 22, which has the general portions 23 and the protrusions 24, is formed on the rear side of the heat transfer restraining layer 37 (see FIG. 4).

The intermediate molded body 55 having the base member 22, which has been molded in the above-described manner, is removed from the mold set 56. Then, a surface treatment agent is applied to the front surface of the front transparent portion 26 of the intermediate molded body 55 to form the hard coating layer 31. In this manner, the emblem 20, which is the final product, is obtained (see FIG. 4). In the emblem 20, as shown in FIG. 2, the main portion 33a of the heating sheet 33 is located in the decorative body portion 21, and the connecting portion 33b is located on the lower side of the rear transparent portion 27, which is in the exterior of the decorative body portion 21. The connecting portion 33b has the connection terminals 36 in the opposite ends of the heater 35.

The emblem 20 is received in the window portion 12 of the front grille 11 from the front. At this time, as shown in FIG. 5, the power-receiving connection terminals 36, which are located in the lower section of the heating sheet 33 of the emblem 20, are brought into contact with and electrically connected to the power-feeding connection terminals 13, which are arranged in the bottom section of the inner wall surface of the window portion 12.

In the emblem 20, the decoration layer 32, which is arranged between the base member 22 and the transparent member 25, exerts a function of decorating a front section of the vehicle. When the emblem 20 is viewed from the front, light is reflected by the uneven decoration layer 32. This allows the characters with metallic luster to appear three-dimensionally behind and through the front transparent portion 26, the heating sheet 33, and the rear transparent portion 27.

As shown in FIGS. 1 and 2, the millimeter wave radar device 15 transmits millimeter waves forward to measure the inter-vehicle distance and relative speed between the vehicle 10 and the vehicle located forward of the vehicle 10. The millimeter waves are transmitted through the base member 22, the heat transfer restraining layer 37, the decoration layer 32, the rear transparent portion 27, the front transparent portion 26, and the hard coating layer 31 of the emblem 20. In the decoration layer 32, the millimeter waves are transmitted through gaps between vapor-deposited metal particles. The millimeter waves are transmitted through a portion without the heater 35 in the main portion 33a of the heating sheet 33, which is arranged between the rear transparent portion 27 and the front transparent portion 26. Those of the millimeter waves that have hit and been reflected by a vehicle or obstacle located on the leading side in the transmitting direction are also transmitted through the decorative body portion 21 and the heating sheet 33. This facilitates transmittance of millimeter waves through the emblem 20, compared to the decorative component for a vehicle disclosed in Japanese Laid-Open Patent Publication No. 2002-22821, which has the metal layer in the decorative body portion.

In at least the transmittance area Z1 (see FIG. 1) of the decorative body portion 21 and the heating sheet 33, the thickness T of the emblem 20 in the front-rear direction is a value satisfying the above-described expression 1 and is uniform. This decreases the attenuation amount of millimeter waves at the time of transmittance, compared to the decorative component for a vehicle disclosed in Japanese Laid-Open Patent Publication No. 2004-138572, in which the front surface of the decorative body portion is uneven and the thickness of the decorative body portion in the front-rear direction is uneven.

If snow adheres to the front surface of the emblem 20, electric power is fed to the heater 35 of the emblem 20 through the power-feeding connection terminals 13 and the power-receiving connection terminals 36, which are electrically connected, from the vehicle. The electric power heats the heater 35. Some of the heat generated by the heater 35 is transferred to the front surface of the emblem 20 through the front transparent portion 26 and the hard coating layer 31, thus melting the snow adhering to the front surface of the emblem 20.

The heating sheet 33 is held in contact with the transparent member 25, which configures the front section of the decorative body portion 21. More specifically, since the heating sheet 33 is arranged between the front transparent portion 26 and the rear transparent portion 27, the heating sheet 33 is located at a position close to the front surface of the decorative body portion 21. This facilitates transfer of the heat of the heater 35 to the snow adhering to the front surface of the emblem 20. The snow is thus efficiently melted by the heat of the heater 35.

The temperature of deflection under load of AES plastic, which is the material of the base member 22, is 78° C., which is relatively low. However, transfer of the heat generated by the heater 35 to the base member 22 is restrained by the heat transfer restraining layer 37, which is arranged between the main portion 33a of the heating sheet 33 and the base member 22. This restrains deformation of the base member 22 by the heat of the heater 35. Thermal deformation of the base member 22 may cause uneven thickness of the decorative body portion 21 in the front-rear direction, thus increasing the attenuation amount of millimeter waves. However, in the first embodiment, the heat transfer restraining layer 37 restrains thermal deformation of the base member 22, thus maintaining the attenuation amount of millimeter waves in a small state. Also, while the heat transferred to the base member 22 decreases, the heat transferred to the snow correspondingly increases, thus improving the snow melting function.

Further, the front transparent portion 26 is protected by the hard coating layer 31 from the front. This restrains damage to the front transparent portion 26, as well as change of properties and deterioration of the front transparent portion 26 caused by sunlight, wind, rain, and temperature changes.

Second Embodiment

A decorative component for a vehicle according to a second embodiment will hereafter be described with reference to FIG. 9.

The second embodiment and the first embodiment are similar in that the heating sheet 33 is configured by the main portion 33a and the connecting portion 33b and that the power-receiving connection terminals 36 of the heater 35 are arranged in the connecting portion 33b. However, the second embodiment employs a routing pattern of the heater 35 in the main portion 33a of the heating sheet 33 that is different from that of the first embodiment. In the main portion 33a, the heater 35 is arranged in an oval shape along the outer peripheral edge of the plastic sheet 34.

Other than these differences, the second embodiment is the same as the first embodiment. Thus, like or the same reference numerals are given to those components that are like or the same as the corresponding components described above in the first embodiment and detailed explanations are omitted.

The emblem 20 of the second embodiment achieves the same operation and advantages as those of the first embodiment. Additionally, when the heater 35 generates heat, some of the heat is transferred to the central section of the area (the transmittance area Z1) of the decorative body portion 21 surrounded by the heater 35 from all directions. The snow adhering to the front surface is thus melted uniformly by the heat of the heater 35, regardless of the positions of the adhering snow.

In the main portion 33a of the heating sheet 33, the heater 35 is located at the position close to the outer peripheral edge of the emblem 20. This makes the heater 35 inconspicuous, thus enhancing aesthetic appearance. Also, the location of the heater 35 is in a section on the outer side of the millimeter wave transmittance area Z1 of the decorative body portion 21. The heater 35 is thus unlikely to hinder the transmittance of millimeter waves. As a result, while the snow melting function is exerted, the millimeter wave transmittance performance is improved.

Third Embodiment

A decorative component for a vehicle according to a third embodiment will hereafter be described with reference to FIGS. 10A and 10B.

In the third embodiment, the transparent member 25 is formed by a single member, unlike the first embodiment, in which the transparent member 25 is divided into the front transparent portion 26 and the rear transparent portion 27. Also, in the third embodiment, the main portion 33a of the heating sheet 33 is arranged to be laminated with the transparent member 25 from the front side of the transparent member 25. The main portion 33a is held in tight contact with the front surface of the transparent member 25 and is integrated with the transparent member 25. The hard coating layer 31 is arranged on the front surface of the main portion 33a of the heating sheet 33.

Although the connecting portion 33b of the heating sheet 33 is not illustrated in FIG. 10A, the connecting portion 33b may be bent rearward at the boundary with the main portion 33a, as in the first embodiment.

Further, a water repellent film 61, which is made of an organic coating film or a silicone film, is arranged on the front surface of the hard coating layer 31.

Other than these differences, the third embodiment is the same as the first embodiment. Thus, like or the same reference numerals are given to those components that are like or the same as the corresponding components described above in the first embodiment and detailed explanations are omitted.

The third embodiment thus achieves the same operation and advantages as those of the first embodiment. Additionally, since the main portion 33a of the heating sheet 33 is arranged in the above-described manner, the main portion 33a is located in the foremost section of the decorative body portion 21. This facilitates transfer of the heat of the heater 35 to the snow adhering to the front surface of the emblem 20. The snow is thus melted further efficiently by the heat of the heater 35.

Also, since the main portion 33a of the heating sheet 33 is protected from the front by the hard coating layer 31, the weather resistance and scratch resistance of the main portion 33a are enhanced.

Further, the water repellent film 61, which is arranged on the foremost surface of the emblem 20, repels water and hampers wetting. This restrains formation of a water film on the front surface of the hard coating layer 31 when the snow melts.

Fourth Embodiment

A decorative component for a vehicle according to a fourth embodiment will now be described with reference to FIGS. 11A and 11B.

The fourth embodiment and the third embodiment are similar in that the transparent member 25 is configured by a single member. However, the fourth embodiment is different from the third embodiment in that at least the main portion 33a of the heating sheet 33 is arranged to be laminated with the base member 22 from the rear side of the base member 22, not the front surface of the transparent member 25. Also, the fourth embodiment lacks the heat transfer restraining layer 37.

Other than these differences, the fourth embodiment is the same as the third embodiment. Thus, like or the same reference numerals are given to those components that are like or the same as the corresponding components described above in the third embodiment and detailed explanations are omitted.

Except that the fourth embodiment lacks the effect of the heat transfer restraining layer 37, the fourth embodiment basically achieves the same operation and advantages as those of the third embodiment. However, since the main portion 33a of the heating sheet 33 is arranged in the above-described manner, the main portion 33a is located in the rearmost section of the decorative body portion 21. This hampers transfer of the heat of the heater 35 to the front surface of the emblem 20, compared to the third embodiment.

However, the decoration layer 32 is located forward of the heating sheet 33 to exert a function of concealing the heating sheet 33. Therefore, when the emblem 20 is viewed from the front, the heating sheet 33 is concealed by the decoration layer 32 and cannot be easily seen.

Additionally, the heating sheet 33 is located in the exterior of the decorative body portion 21. This facilitates the manufacture compared to a case in which the main portion 33a of the heating sheet 33 is arranged in the interior of the decorative body portion 21. For example, the heating sheet 33 may be fixed to the rear surface of the decorative body portion 21 through adhesion. This makes it unnecessary to perform injection molding with the heating sheet 33 inserted and arranged in a fixed mold. The heating sheet 33 is thus not caught by the fixed mold and the movable mold at the time of clamping the molds. Therefore, the power-receiving connection terminals 36 of the heater 35 does not necessarily need to be extended or bent to the exterior of the decorative body portion 21 in the same manner as in the first embodiment. Also, the connection terminals 36 may be replaced by lead wires.

Fifth Embodiment

A decorative component for a vehicle according to a fifth embodiment will hereafter be described with reference to FIGS. 12A and 12B.

The fifth embodiment and the third embodiment are similar in that the transparent member 25 is configured by a single member. However, the fifth embodiment is different from the third embodiment in that at least the main portion 33a of the heating sheet 33 is arranged between the decoration layer 32 and the base member 22, not on the front surface of the transparent member 25, to be laminated with the rear surface of the decoration layer 32 and the front surface of the base member 22. The heat transfer restraining layer 37 is arranged between the main portion 33a and the base member 22.

Other than these differences, the fifth embodiment is the same as the third embodiment. Thus, like or the same reference numerals are given to those components that are like or the same as the corresponding components described above in the third embodiment and detailed explanations are omitted.

The fifth embodiment basically achieves the same operation and advantages as those of the third embodiment. However, since the main portion 33a of the heating sheet 33 is arranged in the above-described manner, the heating sheet 33 is located rearward compared to the third embodiment, although not as rearward as in the fourth embodiment. This hampers transfer of the heat of the heater 35 to the front surface of the emblem 20.

Also, the heating sheet 33 must be shaped in an uneven shape corresponding to the uneven shape of the decoration layer 32.

However, the decoration layer 32 is located forward of the heating sheet 33 and exerts a function of concealing the heating sheet 33. Therefore, when the emblem 20 is viewed from the front, the heating sheet 33 is blocked by the decoration layer 32 and thus cannot be seen easily, as in the fourth embodiment.

The first to fifth embodiments may be modified as follows.

In the first to fifth embodiments, a heating sheet in which a wire-shaped heater configured by a transparent conductive film is arranged on a transparent plastic sheet may be employed as the heating sheet. The transparent conductive film is made of, for example, indium tin oxide (ITO) by sputtering or vapor-deposition of the material. In this case, the heater cannot be seen easily, and the aesthetic appearance of the decorative component for a vehicle is improved.

In the first to fifth embodiments, the shape of the connecting portion 33b of the heating sheet 33 may be modified. FIG. 13 shows a modification of the third embodiment in which the shape of the connecting portion 33b is modified.

In this modification, a protrusion 30, which protrudes downward with respect to the base member 22, is arranged in a lower section of the transparent member 25. This forms a stepped portion between the lower surface of the protrusion 30 and the lower surface of the base member 22. The heating sheet 33 is arranged to be laminated with the front surface of the transparent member 25. The connecting portion 33b of the heating sheet 33 is bent at two positions, which are a front corner portion and a rear corner portion of the protrusion 30 of the transparent member 25. This forms a horizontal bent portion 33c, which extends in the front-rear direction along the lower surface of the protrusion 30, and a vertical bent portion 33d, which extends in the vertical direction along the rear surface of the protrusion 30, in the connecting portion 33b. The power-receiving connection terminals 36 of the wire-shaped heater 35 are arranged in at least the vertical bent portion 33d, among the horizontal bent portion 33c and the vertical bent portion 33d.

On the other hand, the power-feeding connection terminals 13, which extend in the vertical direction, are arranged at positions rearward of the connection terminals 36 in the window portion 12 of the front grille 11.

In this modification, when the emblem 20 is received in the window portion 12 of the front grille 11 from the front, the power-receiving connection terminals 36, which are located on the rear surface of the lower section of the heating sheet 33, are brought into contact with and electrically connected to the power-feeding connection terminals 13, which are arranged in the window portion 12.

Therefore, if snow adheres to the front surface of the emblem 20, electric power is fed to the heater 35 of the emblem 20 from the vehicle through the power-feeding connection terminals 13 and the power-receiving connection terminals 36. This heats the heater 35, thus melting the snow.

In the first embodiment, depending on the combination of plastic materials to form the front transparent portion 26 and the rear transparent portion 27, light is received and reflected at such a refraction index that the heating sheet 33, which is located at the boundary, cannot be seen easily.

The routing pattern of the heater 35 in the main portion 33a of the heating sheet 33 may be modified to a routing pattern different from those of the first and second embodiments.

For example, the heater 35 may be shaped as a straight line. Also when a straight-line heater 35 is employed, it is desirable that the heater 35 be arranged in a section on the outer side of the millimeter wave transmittance area Z1 of the decorative body portion 21, so that the transmittance of millimeter waves are not hindered.

For example, if a heater extending in a straight line in the lateral direction is employed as the heater 35, the heater 35 may be arranged in at least one of the upper section and the lower section of the heating sheet 33. If a heater extending in a straight line in the vertical direction is employed as the heater 35, the heater 35 may be arranged in at least one of the left-side section and the right-side section of the heating sheet 33.

At least the main portion 33a of the heating sheet 33 may be arranged between the decoration layer 32 and the transparent member 25 to be laminated with the decoration layer 32 and the transparent member 25.

Also in the first embodiment, the water repellent film 61 may be arranged on the front surface of the hard coating layer 31.

In the first to fifth embodiments, the water repellent film 61 among the multiple members configuring the decorative body portion 21 may be omitted as needed.

To provide a water repellent property, instead of forming the water repellent film 61, texturing or nanofabrication may be performed on the molding surface of the die used to mold the decorative component for a vehicle.

A water repellent film having a hard coating function may be employed as the water repellent film 61. In this case, the hard coating layer 31 may be omitted.

Figure 14:
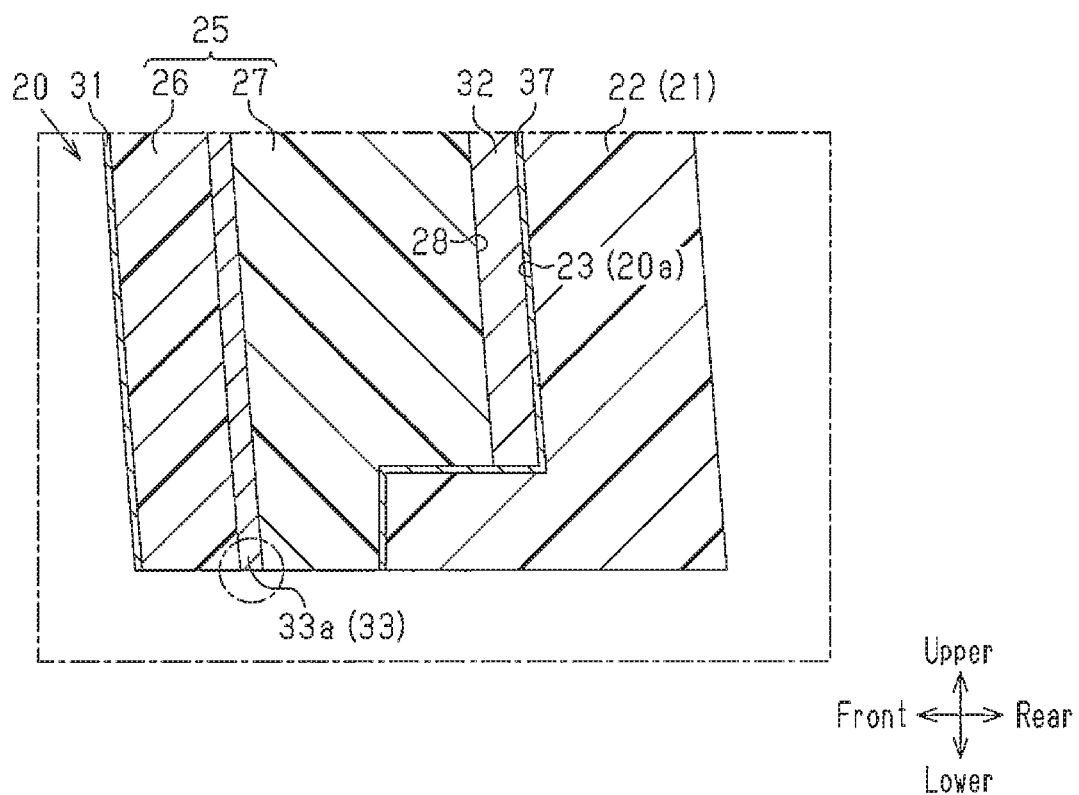
FIG. 14 corresponds to FIG. 5 and is a cross-sectional partial side view illustrating a sealing structure of an outer peripheral section of a main portion of the heating sheet.

An outer peripheral section of the main portion 33a of the heating sheet 33, as represented by the long dashed short dashed lines in FIG. 14, may be sealed by hot melting or potting. This restricts entry of the water generated by melting snow into the gap between the aforementioned outer peripheral section and the adjacent members (the front transparent portion 26 and the rear transparent portion 27), thus enhancing water resistance.

In the first to fifth embodiments, the decorative body portion 21 may be formed as a plate having a shape other than the oval shape.

In the first to fifth embodiments, the emblem 20 may be attached to the vehicle body, instead of the front grille 11.

In the first to fifth embodiments, the means for attaching the emblem 20 to the window portion 12 of the front grille 11 is not particularly restricted. The emblem 20 may be attached to the window portion 12 through engagement using, for example, clips, screws, or hooks.

In the first to fifth embodiments, the heat transfer restraining layer 37 may be omitted when the heating sheet 33 is located at certain positions.

As long as the decorative component for a vehicle is attached to a position in the vehicle 10 on the leading side in the transmitting direction of millimeter waves from the millimeter wave radar device 15 to decorate the vehicle 10 and has millimeter wave transmittance, the decorative component may be employed as any vehicle decorative component other than the emblem 20.

Sixth Embodiment

A decorative component for a vehicle according to a sixth embodiment will now be described with reference to FIGS. 15 to 20. In the drawings, the components are shown in varied scale, as needed, to facilitate recognition of the components, as in FIGS. 1 to 14.

Figure 15:
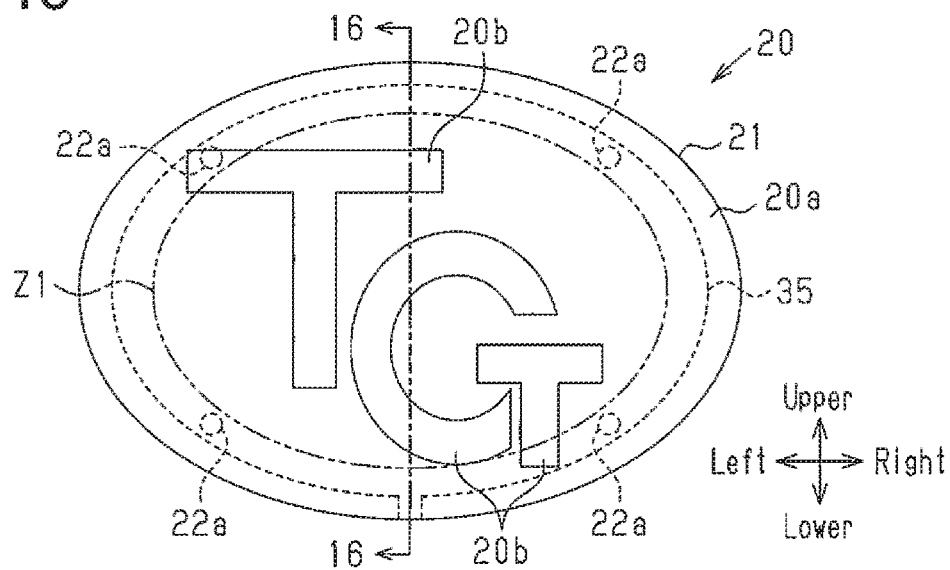
FIG. 15 is a front view showing an emblem according to a sixth embodiment.
Figure 16:
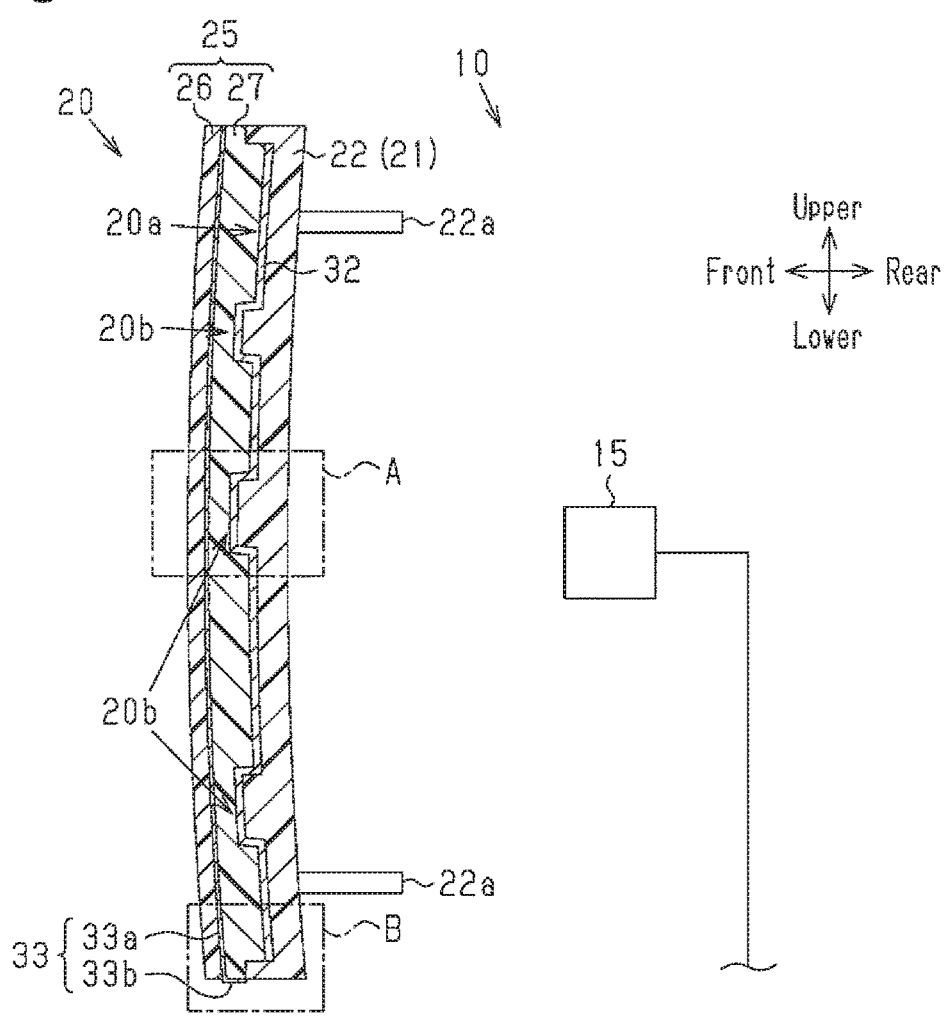
FIG. 16 is a diagram illustrating a cross-sectional structure of the emblem taken along line 16-16 of FIG. 15, together with a millimeter wave radar device.

FIGS. 15 and 16 illustrate the emblem 20 as the decorative component for a vehicle according to the sixth embodiment. Like the emblem 20 according to the first embodiment, the emblem 20 of the sixth embodiment includes the decorative body portion 21 and the heating sheet 33, which configure a main portion of the emblem 20. The decorative body portion 21 includes the base member 22, the transparent member 25, and the decoration layer 32 and is shaped as an oval plate as a whole. The transparent member 25 is arranged on the front side of the base member 22. The decoration layer 32 is arranged between the base member 22 and the transparent member 25 and has millimeter wave transmittance. The decorative body portion 21 is gently curved to bulge forward.

Figure 17:
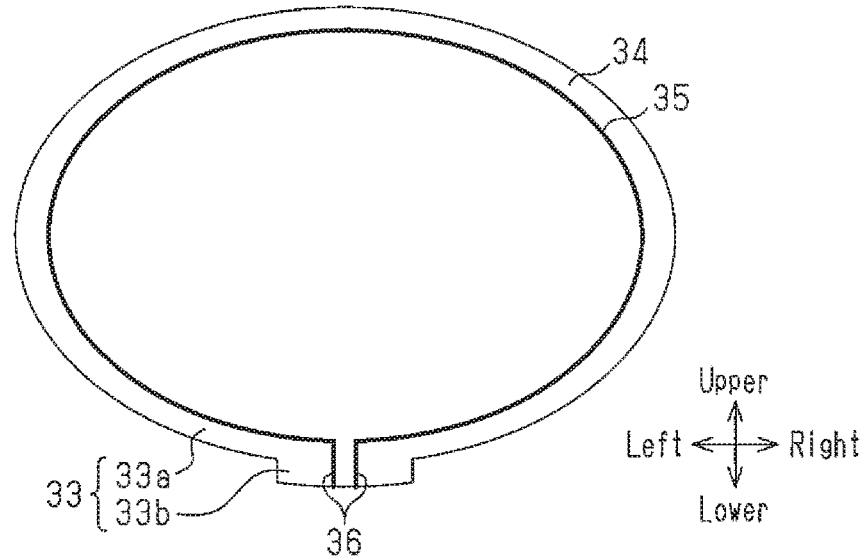
FIG. 17 is a front view showing a heating sheet when removed from the emblem of the sixth embodiment.
Figure 19:
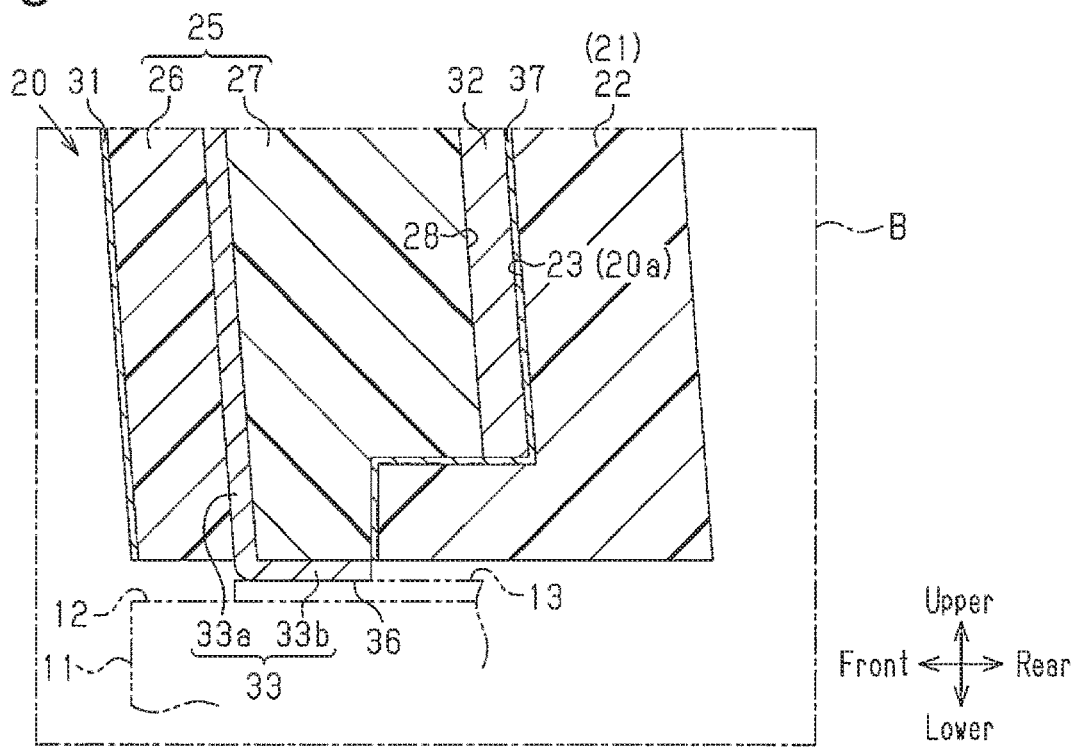
FIG. 19 is an enlarged cross-sectional side view showing Section B of FIG. 16.

Also like the emblem 20 of the first embodiment, the heating sheet 33 includes the connecting portion 33b, which extends from the lower end of the main portion 33a to the exterior of the decorative body portion 21, in addition to the main portion 33a (see FIGS. 17 and 19). The connecting portion 33b is bent rearward at the boundary with the main portion 33a and extends rearward from the lower end of the main portion 33a. FIG. 17 shows the connecting portion 33b in a non-bent state. The power-receiving connection terminals 36 of the heater 35 are arranged in the connecting portion 33b. The connection terminals 36 each have a flat shape extending in the front-rear direction.

Figure 18:
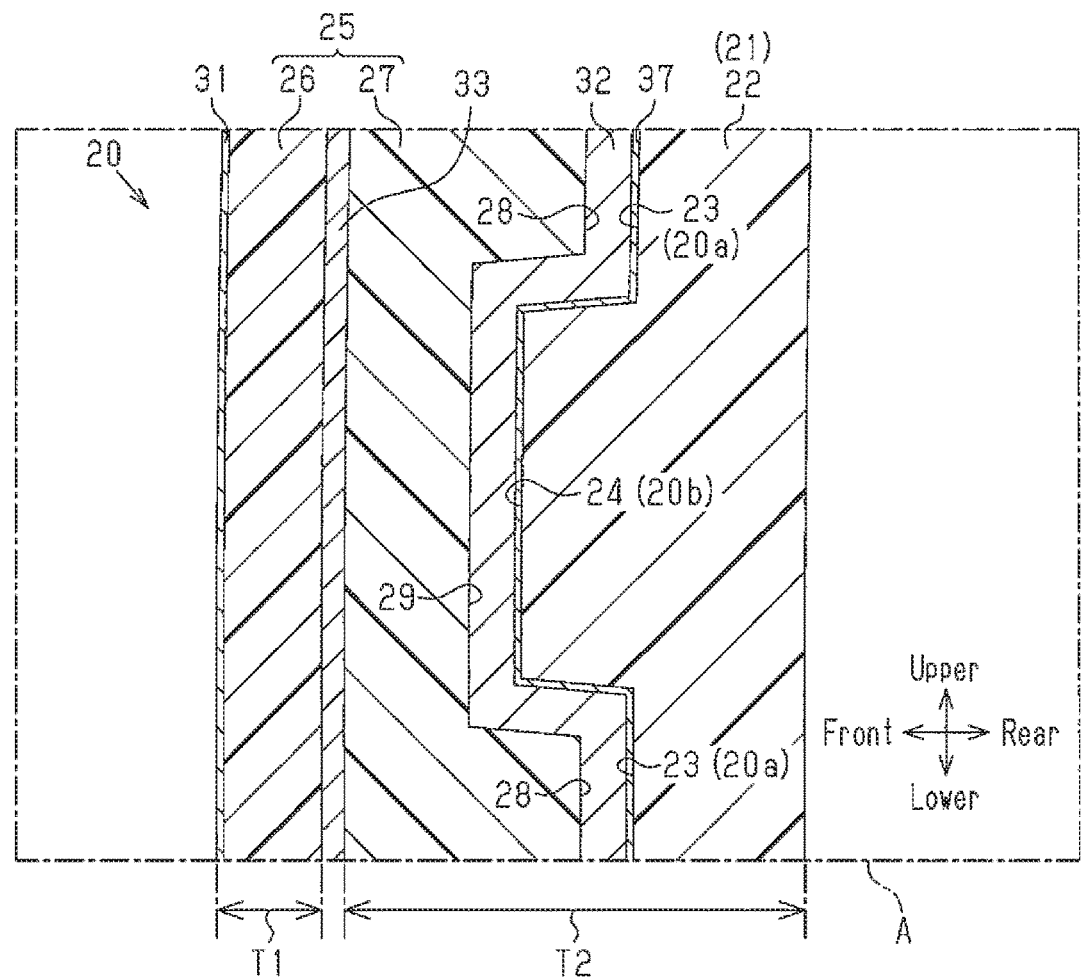
FIG. 18 is an enlarged cross-sectional side view showing Section A of FIG. 16.

Further, as illustrated in FIG. 18, like the first embodiment, the heat transfer restraining layer 37, which is made of material having a higher temperature of deflection under load (a higher heat deformation temperature) than the base member 22, is arranged between the decoration layer 32 and the base member 22. The heat transfer restraining layer 37 is made of ultraviolet (UV) curing coating.

However, as shown in FIGS. 15 and 16, the emblem 20 of the sixth embodiment is different from the first embodiment in that multiple attachment seats 22a for attaching the decorative body portion 21 to the vehicle 10 (the front grille 11) are arranged at positions on the rear surface of the base member 22. The emblem 20 of the sixth embodiment is attached to the vehicle 10 (the front grille 11) by means of the attachment seats 22a.

In the decorative body portion 21, as represented by the long dashed double-short dashed curves in FIG. 15, the millimeter wave transmittance area Z1 is set on the inner side of an area surrounded by the attachment seats 22a.

In the main portion 33a of the heating sheet 33, the heater 35 is arranged in a section on the outer side of the area surrounded by the attachment seats 22a. The location of the heater 35 is in a section on the outer side of the transmittance area Z1 of the decorative body portion 21. As shown in FIG. 17, in the present embodiment, the heater 35 is arranged in an oval shape at a position along the outer peripheral edge of the plastic sheet 34 as a position satisfying the condition.

Other than these differences, the sixth embodiment is the same as the first embodiment. Thus, like or the same reference numerals are given to those components that are like or the same as the corresponding components described above in the first embodiment and detailed explanations are omitted. The emblem 20 of the sixth embodiment achieves the same operation and advantages as those of the first embodiment. The emblem 20 of the sixth embodiment also has the advantages described below.

That is, the heater 35 is arranged in a section on the outer side of the area surrounded by the attachment seats 22a, which is a section on the outer side of the transmittance area Z1 of the decorative body portion 21. Millimeter waves are transmitted through the base member 22, the heat transfer restraining layer 37, the decoration layer 32, the rear transparent portion 27, the front transparent portion 26, and the hard coating layer 31 of the emblem 20 through the transmittance area Z1. Thus, when the decorative body portion 21 transmits the millimeter waves from the millimeter wave radar device 15, the heater 35 is unlikely to hinder the transmittance of the millimeter waves.

The heater 35 is arranged in an oval shape, which is a looped shape surrounding the millimeter wave transmittance area Z1. Some of the heat generated by the heater 35 is thus transferred toward the central section of the transmittance area Z1, which is surrounded by the heater 35, from all directions. The heat melts the snow adhering to the front surface of the emblem 20 at positions corresponding to the transparent area Z1 uniformly, regardless of the positions of the adhering snow.

The sixth embodiment may be modified as follows.

A heating sheet having a wire-shaped heater that is configured by a transparent conductive film and arranged on a transparent plastic sheet may be employed as the heating sheet. The transparent conductive film is made of, for example, indium tin oxide (ITO) by sputtering or vapor deposition. In this case, the heater is cannot be easily seen, and the aesthetic appearance of the decorative component for a vehicle is improved.

As long as the heating sheet 33 is arranged to be laminated with one or adjacent two of the base member 22, the transparent member 25, and the decoration layer 32, the heating sheet 33 may be arranged at any position in the decorative body portion 21 other than that of the sixth embodiment. That is, as long as the heating sheet 33 is arranged to be laminated with at least the base member 22 or the transparent member 25 among the base member 22, the transparent member 25, and the decoration layer 32, the heating sheet 33 may be arranged at any position in the decorative body portion 21 other than that of the sixth embodiment. For example, the heating sheet 33 may be arranged to be laminated with the transparent member 25 from the front side of the transparent member 25. Alternatively, the heating sheet 33 may be arranged to be laminated with the base member 22 from the rear side of the base member 22. In this case, the heat transfer restraining layer 37 is unnecessary. Alternatively, the heating sheet 33 may be arranged between the decoration layer 32 and the base member 22 to be laminated with the decoration layer 32 and the base member 22. Also, the heating sheet 33 may be arranged between the decoration layer 32 and the transparent member 25 to be laminated with the decoration layer 32 and the transparent member 25.

The routing pattern of the heater 35 in the main portion 33a of the heating sheet 33 may be modified to a routing pattern different from that of the sixth embodiment.

The heater 35 may have a straight line shape. Even when the straight-line heater 35 is employed, the heater 35 is arranged in a section on the outer side of the millimeter wave transmittance area Z1 of the decorative body portion 21 so as not to hinder the transmittance of millimeter waves.

If, for example, a heater extending in a straight line in the lateral direction is employed as the heater 35, the heater 35 may be arranged in at least one of the upper section and the lower section of the heating sheet 33. If a heater extending in a straight line in the vertical direction is employed as the heater 35, the heater 35 may be arranged in at least one of the left-side section and the right-side section of the heating sheet 33.

Instead of providing the heater 35 as a portion of the heating sheet 33, the heater 35 may be arranged in the decorative body portion 21 as an independent body.

Figure 20:
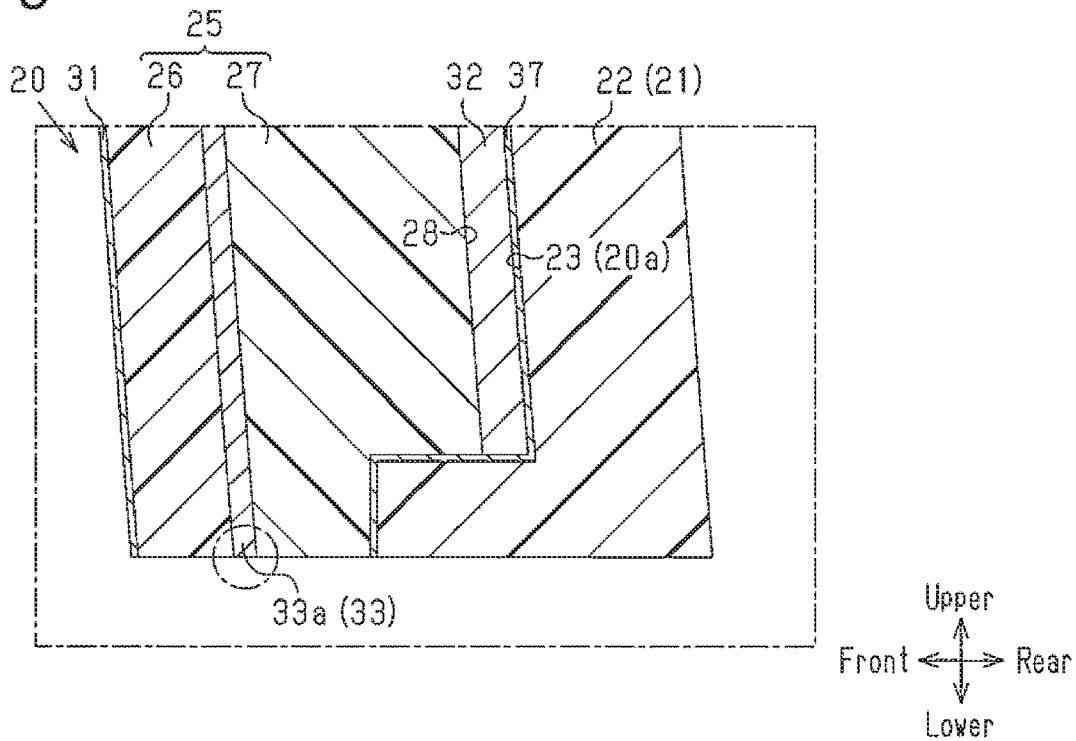
FIG. 20 corresponds to FIG. 19 and is a cross-sectional partial side view illustrating a sealing structure of an outer peripheral section of a main portion of the heating sheet.

An outer peripheral section of the main portion 33a of the heating sheet 33, as represented by the long dashed short dashed lines in FIG. 20, may be sealed by hot melting or potting. This restricts entry of the water generated by melting snow into the gap between the outer peripheral section and the adjacent members (the front transparent portion 26 and the rear transparent portion 27), thus enhancing water resistance.

In the sixth embodiment, depending one the combination of plastic materials to form the front transparent portion 26 and the rear transparent portion 27, light is received and reflected at such a refraction index that the heating sheet 33, which is located at the boundary, cannot be seen easily.

The front surface of a member located at the foremost position in the decorative component may have a water-repellent property. The front surface of the member thus repels water, hampering wetting of the member. This restrains formation of a water film on the front surface of the member when the snow melts.

To provide a water repellent property, a water repellent film configured by an organic coating film or a silicone film, for example, may be arranged on the front surface of the aforementioned member. Alternatively, texturing or nanofabrication may be performed on a molding surface of the mold used to mold the member.

A water repellent film having a hard coating function may be employed as the aforementioned water repellent film. In this case, the hard coating layer 31 may be omitted.

The emblem 20 may be attached to the vehicle body, instead of the front grille 11.

The decorative body portion 21 may be formed as a plate having a shape other than the oval shape.

As long as the decorative component for a vehicle is attached to a position in the vehicle 10 on the leading side in the transmitting direction of millimeter waves from the millimeter wave radar device 15 to decorate the vehicle 10 and has millimeter wave transmittance, the decorative component may be employed as any decorative component for a vehicle other than the emblem 20.

The invention claimed is:

1. A decorative component for a vehicle comprising
a decorative body portion having a millimeter wave transmittance, wherein the decorative body portion is configured to be attached to part of a vehicle on a leading side in a transmitting direction of a millimeter wave from a millimeter wave radar device to decorate the vehicle; and
a heating sheet including a plastic sheet and a wire-shaped heater provided on the plastic sheet, wherein
at least a main portion of the heating sheet is provided integrally with the decorative body portion,
in the decorative body portion and the heating sheet, a thickness in a front-rear direction is set uniform in at least a transmittance area of the millimeter wave, the heating sheet is provided integrally with the decorative body portion only at the main portion, the heating sheet includes connection terminals arranged in opposite ends of the heater and a connecting portion extending from the main portion to an exterior of the decorative body portion, the connection terminals are provided in the connecting portion, and the connecting portion is bent rearward at a boundary with the main portion and extends rearward from a lower end of the main portion.

2. The decorative component according to claim 1, wherein the decorative body portion includes
 a base member made of a plastic material,
 a transparent member made of a plastic material and arranged on a front side of the base member in the transmitting direction, and
 a decoration layer provided between the base member and the transparent member and having a millimeter wave transmittance, and
at least the main portion of the heating sheet is arranged to be laminated with one of at least the base member and the transparent member, among the base member, the transparent member, and the decoration layer.

3. The decorative component according to claim 2, wherein the transparent member is divided into a front transparent portion and a rear transparent portion located on a rear side of the front transparent portion, and at least the main portion of the heating sheet is arranged between the front transparent portion and the rear transparent portion to be laminated with the front transparent portion and the rear transparent portion.

4. The decorative component according to claim 2, wherein at least the main portion of the heating sheet is arranged to be laminated with the base member from a rear side of the base member.

5. The decorative component according to claim 2, wherein at least the main portion of the heating sheet is arranged between the decoration layer and the base member to be laminated with the decoration layer and the base member.

6. The decorative component according to claim 3, further comprising a hard coating layer provided on a front surface of the transparent member, wherein the hard coating layer has a hardness greater than that of the transparent member.

7. The decorative component according to claim 4, further comprising a hard coating layer provided on a front surface of the transparent member, wherein the hard coating layer has a hardness greater than that of the transparent member.

8. The decorative component according to claim 5, further comprising a hard coating layer provided on a front surface of the transparent member, wherein the hard coating layer has a hardness greater than that of the transparent member.

9. The decorative component according to claim 2, wherein at least the main portion of the heating sheet is arranged to be laminated with the transparent member from a front side of the transparent member.

10. The decorative component according to claim 9, wherein the decorative component includes a hard coating layer arranged on a front surface of at least the main portion of the heating sheet, the hard coating layer having a hardness greater than that of the heating sheet.

11. The decorative component according to claim 6, further comprising a water repellent film provided on a front surface of the hard coating layer.

12. The decorative component according to claim 7, further comprising a water repellent film provided on a front surface of the hard coating layer.

13. The decorative component according to claim 8, further comprising a water repellent film provided on a front surface of the hard coating layer.

14. The decorative component according to claim 10, further comprising a water repellent film provided on a front surface of the hard coating layer.

15. A decorative component for a vehicle comprising
 a decorative body portion having a millimeter wave transmittance, wherein the decorative body portion is configured to be attached to part of a vehicle on a leading side in a transmitting direction of a millimeter wave from a millimeter wave radar device to decorate the vehicle; and
a heating sheet including a plastic sheet and a wire-shaped heater provided on the plastic sheet, wherein
at least a main portion of the heating sheet is provided integrally with the decorative body portion,
in the decorative body portion and the heating sheet, a thickness in a front-rear direction is set uniform in at least a transmittance area of the millimeter wave,
the heating sheet includes connection terminals arranged in opposite ends of the heater and a connecting portion extending from the main portion to an exterior of the decorative body portion,
the connection terminals are provided in the connecting portion, and
the connecting portion is bent rearward at a boundary with the main portion and extends rearward from a lower end of the main portion.

* * * * *